Patented Apr. 8, 1941

2,237,483

UNITED STATES PATENT OFFICE 2,237,483

COLORED OXIDE FILM ON METALS CONSISTING OF THE CLASS OF ALUMINUM AND ALLOYS THEREOF AND PROCESS OF PRODUCING SAME

Charles Graenacher, Riehen, and Max Matter, Basel, Switzerland, assignors to the firm of Society of Chemical Industry in Basle, Basel, Switzerland No Drawing. Application January 13, 1939, Serial No. 250,846. In Switzerland January 15, 1938

7 Claims. (Cl. 148—6)

This invention relates to the dyeing of an oxide film on metals consisting of the class of aluminum and an alloy thereof with water-soluble acyl derivatives of the dyestuffs as are described in Patents Nos. 2,120,741, 2,095,600 and 2,120,743 as well as in patent applications Serial No. 92,244, filed July 23, 1936, issued Aug. 22, 1939 as U. S. Patent No. 2,170,262, and Serial No. 173,528, filed November 8, 1937, and further in British Patent No. 480,358.

These acyl derivatives of dyestuffs are quite generally obtained by causing to react, in the presence of a tertiary base, such as pyridine, sparingly water-soluble dyestuffs containing at least one substituent incapable of forming salts stable to water selected from the group consisting of OH- and NH-groups, with acylating agents containing at least one acid halide group and at least one group which imparts increased water-solubility to the acylation product formed. The products thus obtained are characterized by the following common properties:—The water-solubility which is due to the acyl-group; the capability of being easily split while regenerating the sparingly soluble parent dyestuff by dilute aqueous solutions of saponifying agents, such as dilute aqueous solutions of alkalies. Dyestuffs suitable for producing the acyl derivatives are, for example, azo-dyestuffs which are produced by coupling diazotized amines with hydroxy-compounds capable of coupling, provided that the diazo-compound and the coupling component do not contain groups lending solubility or groups lending so little solubility that the dyestuff produced is practically insoluble in water. The coupling components may contain a hydroxyl group, which determines the coupling, in an isocyclic- or heterocyclic-ring, or in an open chain. Besides the azo-dyestuffs, dyestuffs of other classes are suitable, for instance dyestuffs of the anthraquinone series which contain a hydroxyl group; also hydroxyl derivatives of suitable dyestuffs of the azine, oxazine, thiazine, arylmethane and pyrone series.

Insoluble dyestuffs, in which the salt-forming group which yields no salt stable to water is an $NH_2$ or NH, may themselves belong to the aforesaid dyestuff series. They may also, for instance, be condensation products of cyanuric chloride with amines, which still contain chromophore groups, for example azo-groups.

The water-soluble decomposable derivatives of water-insoluble dyestuffs of the kind described above, which are required in the invention, are obtained by the action of a compound having at least one acid halide group and at least one substituent which of itself or after suitable change determines an enhanced solubility of the product. Such compounds are, for instance, aliphatic, cycloaliphatic, aliphatic-aromatic or aromatic carboxylic acid halides or sulfonic acid halides, for example acid chlorides or acid bromides. Specific instances are sulfoacetyl chloride, sulfofuranecarboxylic acid chloride, sulfobenzoyl chloride, benzoic acid sulfochloride, benzene-hexacarboxylic acid dichloride and -trichloride, naphthalene-trisulfochloride, products of reaction of sulfur trioxide on benzoyl chloride and of chloro-sulfonic acid on benzoic acid. To these compounds belong also purely inorganic acid halides of polybasic acids, for instance chlorosulfonic acid, which must be regarded as sulfuric acid monochloride. The said acid halide groups are in condition to react with the aforesaid salt-forming groups of the dyestuffs to form compounds capable of scission. The further substituent present in the acid halide molecule, which determines the enhanced solubility of the product of reaction, either of itself or after suitable change, may be any group capable of dissociation, for instance a carboxyl group or a sulfonic acid group, which has the effect that the compound obtained can pass into solution as an anion. In the same sense an OH-group may be effective if its hydrogen atom is capable of dissociation, for instance phenolic OH-groups in polyhydric phenols or OH-groups which are substituents of an inorganic acid, that is at least dibasic, for example the OH-group of chlorosulfonic acid HO—SO₂—Cl.

Substituents which after suitable change, enhance the solubility of the product obtained, are, for example, halogen atoms which can combine with a tertiary amine, for instance pyridine, trimethylamine or triethylamine, to form quaternary ammonium compounds and produce the effect that the compound obtained can pass into the solution as a cation. In the same sense other substituents are effective, for instance tertiary amino-groups, which can combine with halogen hydrocarbons to form quaternary compounds, also thio-ethers or the like.

Reaction between the aforesaid insoluble dyestuffs and the aforesaid acid halides may be conducted with advantage by heating together the two components in a tertiary base acting as a solvent, for instance pyridine or dimethylaniline. Further data on the manufacture of the acyl derivatives used here are found in the patents and patent applications hereinbefore mentioned.

The oxide film on metals consisting of the class of aluminum and an alloy thereof which is to be dyed according to the present process may be obtained by various processes, for instance preferably by electrolytic oxidation, such as in a bath containing sulfuric acid, oxalic acid, ammonium bicarbonate or chromic acid, or also by a purely chemical oxidation, such as can be produced in an acid or an alkaline bath containing, for instance, a salt of chromic acid or of hydrofluoric acid or of hydrofluosilicic acid and, if desired, another heavy metal salt, for instance a tungstate, a uranate or a titanate.

The dyeing of the oxide films with the acyl derivatives of dyestuffs coming into question here, of which the most interesting group represents the acyl derivatives of the general formula R₁—O—R₂, in which R₁ represents a radical derived from a sparingly soluble azo-dyestuff containing at least one OH-group which is incapable of forming salts stable against water, and R₂ represents an acyl radical containing at least one group causing the solubility of the product, is preferably effected in two stages, i. e., by bringing first of all the acyl derivatives of the dystuffs into contact with the material to be dyed (dyeing) and then regenerating (saponifying) the dyestuff.

Among the products of the above explained general formula R₁—O—R₂ those are again particularly valuable wherein R₁ represents a radical derived from a sparingly soluble azo-dyestuff obtained itself from a diazo-compound free from carboxyl- and sulfo-groups combined with an arylide of the 2:3-hydroxynaphthoic acid which is also free from sulfo-groups and carboxyl-groups, and wherein R₂ represents a benzoyl radical containing at least one and at the most two sulfo-groups.

The oxide film on metals consisting of the class of aluminum and its alloys may be dyed in various manner; for example, the oxide film may be treated with a solution of the acyl derivative of the dyestuff in water, alcohol, acetone, pyridine and the like, or the solution may be sprayed onto the oxide film or painted on it, or the dyestuff may be printed in the form of a paste on the oxide film. According to the nature of the acyl derivatives of the dyestuffs the dye-bath may be neutral or weakly alkaline, and may contain additions such as Glaubers salt, or it may be acid, containing mineral acid or organic acid. The temperature of the dye-bath may vary within wide limits. For obtaining the best results, however, it is in many cases of advantage to suit the temperature of the dye-bath to the degree of hydration of the oxide film.

Dyeing may also be effected in such a manner that it is carried out simultaneously with the production of the oxide film on metals consisting of the class of aluminum and an alloy thereof. This modification has the advantage that there is only one stage in the process.

If the oxide films have been dyed with such acyl derivatives of the dyestuffs which are saponifiable by alkalies, they are treated with dilute solutions of weak alkalies, for instance with dilute ammonia or sodium carbonate solution. If, however, the oxide films have been dyed with acyl derivatives of dyestuffs capable of being decomposed by acids, they are treated with dilute mineral acids or dilute organic acids. In both cases the oxide film is dyed intensive tints which are characterized by their surprising properties, particularly their beauty and their fastness to water and rubbing.

The products obtained according to the present invention represent therefore compositions of matter consisting of two components, viz. an oxide film on aluminum and a sparingly soluble dyestuff containing at least one substituent incapable of forming salts stable to water selected from the group consisting of OH- and NH-groups. Among such compositions of matter those are particularly valuable in which the oxide film of aluminum is electrolytically produced, and the sparingly soluble dyestuff is a sparingly soluble azo-dyestuff, such as for example a dyestuff obtained from a diazo-component free from sulfogroups and carboxyl-groups and an arylide of the 2:3-hydroxynaphthoic acid.

The success of this process is entirely surprising, for there were no data available that dyeings produced in such a manner would be fast, particularly fast to water and rubbing. Further, such oxide films cannot be colored with ester-like derivatives of leuco compounds of vat dyestuffs such as are marketed under the registered name "Indigosol."

With regard to the production, properties, and enumeration of the acyl derivatives of the dyestuffs which are applied here, reference is again made to the publications mentioned at the beginning of this specification. The application of the process is illustrated by the following examples, the parts being by weight:

*Example 1*

1 part of the reaction product obtained by causing metasulfobenzoyl chloride to act on the azo-dyestuff from diazotized 2-methyl-4-nitraniline and 2:3-hydroxynaphthoic acid-ortho-toluidide, is dissolved in 100 parts of water. A sheet of aluminum, the surface of which has previously been oxidized by electrolysis, is immersed for about ½ hour at 50° C. in this dyestuff solution. The aluminum sheet is then rinsed with cold water and introduced for 20 minutes into a solution consisting of 900 parts of saturated common salt solution, 100 parts of water and 100 parts of an ammonia solution of 25 per cent strength. After thorough rinsing with water the aluminum sheet which is colored a nice bluish-red tint is dried. The coloring is intensive and very fast.

The following table gives information on the colorings which may be obtained by using further water-soluble acyl derivatives of water-insoluble azo-dyestuffs:

The following table gives information on the colorings which may be obtained by using in

| | Azo-dyestuff | Acylating agent | Color of the oxidized aluminum |
|---|---|---|---|
| 1 | Aminochloranisol (OCH$_3$NH$_2$Cl 1:2:4) → 2:3-hydroxynaphthoic acid-ortho-anisidide. | Benzoic acid-3-sulfochloride | Red. |
| 2 | Nitrotoluidine (CH$_3$NH$_2$NO$_2$:1:2:4) → 2:3-hydroxynaphthoic acid-anilide. | do | Do. |
| 3 | 4-(4'-methyl)-phenoxyacetyl-amino-2:5-diethoxy-1-amino-benzene → 2:3-hydroxy-naphthoic acid-anilide. | do | Blue. |
| 4 | 2:5-dichloraniline → 2:3-hydroxynaphthoic acid-ortho-anisidide | do | Red. |
| 5 | 4-chlorbenzene-azo-4'-amino-3'-methoxynaphthalene → 2:3-hydroxynaphthoic acid-anilide. | do | Blue. |
| 6 | 4:4'-diaminodiphenylether → 2:3-hydroxynaphthoic acid-anilide | do | Red. |
| 7 | 2:5-dichloraniline → 2:3-hydroxynaphthoic acid-anilide | Benzoic acid-3:5-disulfochloride | Do. |
| 8 | Aminochloranisol (OCH$_3$NH$_2$Cl:1,2,4) → 2:3-hydroxy-naphthoic acid-ortho-anisidide. | do | Do. |
| 9 | Aniline → α-naphthol | do | Orange. |
| 10 | Aniline → 2:4-dihydroxy-quinoline | do | Yellow. |
| 11 | Dianisidine → β-naphthol | Sulfosalicylic acid-dichloride | Blue. |
| 12 | 4-amino-azobenzene → β-naphthol | Benzoic acid-3-sulfochloride | Bordeaux. |
| 13 | 3:3'-diaminobenzanilide → p-cresol | do | Yellow. |
| 14 | Ortho-aminoazotoluene → β-naphthol | 1-benzoylamino-3-benzene-carboxylic acid-3':5'-disulfochloride | Bordeaux. |
| 15 | Ortho-aminoazotoluene → para-cresol | 1:3:6-naphthalene-trisulfonic acid-chloride | Brown. |
| 16 | 1-aminonaphtalene → anilide of 2:3-hydroxynaphthoic acid | 1:3:6-naphthalene-trisulfochloride | Bordeaux. |
| 17 | Meta-chloraniline → anilide of 2:3-hydroxynaphthoic acid | Naphthoic acid-disulfochloride | Orange. |
| 18 | 4-(4'-methyl)-phenoxyacetylamino-2:5-dimethoxy-1-aminobenzene → anilide of 2:3-hydroxy-naphthoic acid. | Furane-a:a'-sulfocarboxylic acid chloride | Blue. |
| 19 | Dianisidine → β-naphthol | 4-chloromethyl-benzoyl chloride in presence of pyridine. | Violet. |
| 20 | 2-methyl-4:4'diamino-5-methoxyazobenzene → β-naphthol | do | Do. |
| 21 | 1-naphthylamine → β-naphthol | do | Bordeaux. |
| 22 | 1-naphthylamine → β-naphthol | Nicotinic acid chloride in presence of pyridine | Do. |

*Example 2*

1 part of the reaction product obtained by causing metasulfobenzoyl chloride to act on the tertiary condensation product from 1 mol of cyanuric chloride, 2 mols of 2-amino-anthraquinone and 1 mol of aniline, is dissolved in 100 to 150 parts of water. This solution may be used for coloring aluminum sheets according to the process described in Example 1.

There is obtained a nice, fast yellow coloring.

The following table gives information on the colorings which may be obtained by using in similar manner further acyl derivatives of this kind:

| | Dyestuff | Acylating agent | Color of the oxidized aluminum |
|---|---|---|---|
| 1 | Condensation product from 1 mol cyanuric chloride, 2 mols 2-aminoanthraquinone and 1 mol aminopyrene. | Para-μ-chloromethyl-benzoyl chloride (in the presence of pyridine). | Yellow. |
| 2 | Condensation product from 1 mol cyanuric chloride, 1 mol aniline and 2 mols 4-amino-3:2'-dimethylazo-benzene. | do | Do. |
| 3 | 4-benzoylaminoazo-benzene | do | Do. |

*Example 3*

Exactly the same result as in Example 2 is obtained if instead of the reaction product described in that example there is used the reaction product which is obtained by causing μ-chloromethylbenzoyl chloride to act on the tertiary condensation product from 1 mol of cyanuric chloride, 2 mols of 2-amino-anthraquinone and 1 mol of aniline.

*Example 4*

The reaction product which is obtained by causing 3:5-disulfobenzoyl chloride to act on the disazo-dyestuff produced by coupling 2-methoxydiazobenzene and 2:5-dimethyl-1-aminobenzene, diazotizing this aminoazo-dyestuff and coupling with 3-methyl-4-chlorophenol, is dissolved in the hundred fold quantity of water. According to the process described in Example 1, nice, fast brown colorings are obtained on aluminum.

*Example 5*

The reaction product which is formed by causing disulfobenzoyl chloride to act on 1:5-dioxy-4:8-di-para-methoxybenzoylaminoanthraquinone, is dissolved in the hundred fold quantity of water. According to the process described in Example 1, an intensive, fast Bordeaux coloring is obtained on aluminum.

The following table gives information on the colorings which may be obtained by using in similar manner further acyl derivatives of in-

| | Dyestuff | Acylating agent | Color of the oxidized aluminum |
|---|---|---|---|
| 1 | 4-benzoylamino-3:2'-dimethylazobenzene | Benzoic acid-3:5-disulfo chloride | Yellow. |
| 2 | Condensation product from 2 mols. 4-amino-azobenzene and 1 mol 2:4-dichloroquinazoline. | do | Do. |
| 3 | Condensation product from 3 mols 4-amino-3:2'-dimethylazobenzene and 1 mol cyanuric chloride. | do | Do. |
| 4 | 2-acetylaminoanthraquinone | do | Do. |
| 5 | Condensation product from 1 mol cyanuric acid chloride, 2 mols 1-amino-4-methoxyanthraquinone and 1 mol ammonia. | Benzoic acid metasulfo chloride | Red. |
| 6 | Condensation product from 1 mol 4-aminoazobenzene 1 mol aniline and 1 mol 2-aminoanthraquinone. | Sulfo-chloroacetic acid chloride | Yellow. | soluble dyestuffs of the above type containing hydroxyl-groups:

| | Dyestuff | Acylating agent | Color of the oxidized aluminum |
|---|---|---|---|
| 1 | 1:5-dibenzoyldiamino-4:8-dihydroxyanthra-quinone | Benzoic acid-3:5-disulfochloride | Blue-violet. |
| 2 | 1-hydroxy-4-para-tolylamino-anthraquinone | do | Do. |
| 3 | 1:5-diamino-4:8-dihydroxyanthraquinone | Benzoic acid-3-sulfochloride | Do. |
| 4 | Benz—2-benz'—2'-dihydroxydibenzanthrone | do | Green. |
| 5 | 1:5-dibenzoyldiamino-4:8-dihydroxyanthraquinone | Chloromethylbenzoylchloride | Blue-violet. |
| 6 | Benzene-2-benzene'-2'-dihydroxydibenzanthrone | do | Greene. |

Example 6

To 1000 parts of an oxalic acid bath of 3 per cent strength used for producing an anodic film on aluminum (Zeitschrift f. elektr. Chemie, vol. 37, pages 721-724) there are added 5 parts of the reaction product which is obtained by causing meta-sulfo-benzoyl chloride to act on the tertiary condensation product from 1 mol of cyanuric chloride, 2 mols of 2-aminoanthraquinone and 1 mol of aniline in aqueous solution. In the subsequent anodic treatment the ester-like product is precipitated onto the oxide layer. The latter is colored an intensive, fast yellow tint when treated in known manner with dilute ammonia solution.

Example 7

Into a solution of 1 per cent strength of the sulfuric acid ester of the azo-dyestuff from diazotized 2-methyl-5-methyl-1-aminobenzene and para-cresol there is immersed at 40–50° C. a strip of anodically oxidized aluminum and the temperature of the solution is maintained for ½ hour. The aluminum is thus colored clearly yellow. After rinsing with water for a short time the aluminum strip is developed by immersing it for some time at room temperature into a sulfuric acid or acetic acid solution of ½ per cent strength, whereupon it is rinsed and dried. The tint is thereby displaced to a fast brown yellow.

The following table gives information on the colorings which may be obtained by using in similar manner further acyl derivatives of this kind:

| | Parent dyestuff | Acylating agent in the presence of pyridine | Color of the oxidized aluminum |
|---|---|---|---|
| 1 | Trisazo-dyestuff from 1 mol tetrazotized 4:4'-diamino-2-methyl-5-methoxy-azobenzene and 2 mols para-cresol. | Chlorosulfonic acid | Brown. |
| 2 | Monoazo-dyestuff from diazotized dehydrothiotoluidine and para-cresol | do | Yellow. |
| 3 | Monoazo-dyestuff from diazotized 2-methoxy-5-methyl-1-aminobenzene and 1-hydroxy-2:4-dimethylbenzene. | do | Do. |
| 4 | Disazo-dyestuff from the diazotized monoazo-dyestuff from 4-chloro-diazo-benzene and 1-amino-2-methoxynaphthalene and 1-hydroxy-3-methyl-4-chlorobenzene. | do | Brown. |

What we claim is:

1. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble dyestuff obtained by the reaction, in presence of pyridine, of a dyestuff containing at least one salt forming group forming salts with alkalies which are hydrolyzed by water selected from the group consisting of —OH— and —NH— groups, with acylating agents containing at least one acid halide group and at least one group which imparts to the formed product increased water-solubility, and then with a solution of a saponifying agent.

2. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble dystuff obtained by the reaction, in presence of pyridine, of a dyestuff containing at least one OH— group forming salts with alkalies which are hydrolyzed by water, with acylating agents containing at least one acid halide group and at least one group which imparts to the formed product increased water-solubility, and then with a solution of an alkaline saponifying agent.

3. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble azo-dyestuff obtained by the reaction, in presence of pyridine, of an azo-dyestuff containing at least one OH— group forming salts with alkalies which are hydrolyzed by water, with acylating agents containing at least one acid halide group and at least one group which imparts to the formed product increased water-solubility, and then with a solution of an alkaline saponifying agent.

4. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble azo-dyestuff obtained by the reaction, in presence of pyridine, of an azo-dyestuff containing at least one OH— group forming salts with alkalies which are hydrolyzed by water, with halides of aromatic acids of the benzene series which contain one carboxyl group and at least one but not more than two sulfonic groups, and then with a solution of an alkaline saponifying agent.

5. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble azo-dyestuff obtained by the reaction, in presence of pyridine, of a sparingly soluble azo-dyestuff which is itself obtained by uniting a diazo-compound free from sulfo and carboxyl groups with an arylide of 2:3-hydroxynaphthoic acid, with halides of aromatic acids of the benzene series which contain one carboxyl group and at least one but not more than two sulfonic groups, and then with a solution of an alkaline saponifying agent.

6. A process of coloring an electrolytically produced oxide film on a metal selected from the class consisting of aluminum and alloys thereof, which comprises treating the oxide film on metals consisting of the class of aluminum and an alloy thereof with a solution of a water-soluble acyl derivative of a sparingly soluble azo-dyestuff obtained by the reaction, in presence of pyridine, of a sparingly soluble azo-dyestuff which is itself obtained by uniting a diazo-compound free from sulfo and carboxyl groups with an arylide of 2:3-hydroxynaphthoic acid, with halides of aromatic acids of the benzene series which contain one carboxyl group and at least one sulfonic group, and then with a solution of an alkaline saponifying agent.

7. An oxide film on a metal selected from the class consisting of aluminum and alloys thereof and colored by a sparingly soluble azo-dyestuff obtained by the saponification of a water-soluble acyl derivative of an insoluble azo-dyestuff which is itself produced by the combination of a diazo compound and an arylide of 2:3-hydroxynaphthoic acid, said film being characterized by the excellent fastness of its color.

CHARLES GRAENACHER.
MAX MATTER.